(12) United States Patent
Weekes

(10) Patent No.: US 7,147,155 B2
(45) Date of Patent: Dec. 12, 2006

(54) GLOBAL ORIGIN AND DEPARTURE INFORMATION SYSTEM

(76) Inventor: David Weekes, 4th Avenue #33 Mangrove Grove, Opposite Sugar Cane Club, Maynards, St. Peter 618 (BB)

( * ) Notice: Subject to any disclaimer, the term of this patent is extended or adjusted under 35 U.S.C. 154(b) by 0 days.

(21) Appl. No.: 11/020,524

(22) Filed: Dec. 27, 2004

(65) Prior Publication Data

US 2006/0202029 A1    Sep. 14, 2006

Related U.S. Application Data

(60) Provisional application No. 60/590,436, filed on Jul. 23, 2004, provisional application No. 60/578,283, filed on Jun. 10, 2004.

(51) Int. Cl.
*G07B 15/02* (2006.01)
*G06K 5/00* (2006.01)
*G06Q 99/00* (2006.01)

(52) U.S. Cl. ................... 235/384; 235/380; 705/1

(58) Field of Classification Search ............... 235/375, 235/380, 382, 384; 705/6, 10, 13, 1; 348/207.99
See application file for complete search history.

(56) References Cited

U.S. PATENT DOCUMENTS 6,926,203 B1 * 8/2005 Sehr ..................... 235/492

2002/0198731 A1 * 12/2002 Barnes et al. .................. 705/1
2005/0128304 A1 * 6/2005 Manasseh et al. ...... 348/207.99
2006/0031113 A1 * 2/2006 Poage et al. .................. 705/10

OTHER PUBLICATIONS

Notification of Transmittal of the International Search Report and the Written Opinion of the International Searching Authority, or the Declaration, Jul. 5, 2006 (10 pages).

* cited by examiner

*Primary Examiner*—Karl D. Frech
*Assistant Examiner*—April A. Taylor
(74) *Attorney, Agent, or Firm*—Finnegan, Henderson, Farabow, Garrett & Dunner, L.L.P.

(57) ABSTRACT

Embodiments consistent with the invention provide a method for managing traveler information of a traveler having a country of origin and traveling from a country of embarkation to a country of destination. The method includes receiving input data from a graphic user interface containing traveler information at the country of embarkation, sending the traveler information to the country of origin, and requesting confirmation from the country of origin of the accuracy of the traveler information by comparing the traveler information with data received from at least one of a police department, customs department, or immigration department. The method further includes receiving the confirmed traveler information from the country of origin and verifying traveler identity at the country of embarkation.

31 Claims, 3 Drawing Sheets

GLOBAL ORIGIN AND DEPARTURE INFORMATION SYSTEM

CROSS-REFERENCE TO RELATED APPLICATION(S)

This application claims the benefit of priority from U.S. Provisional Application No. 60/578,283, filed on Jun. 10, 2004 and U.S. Provisional Application No. 60/590,436, filed on Jul. 23, 2004, the disclosures of which are expressly incorporated herein by reference to their entirety.

DESCRIPTION

1. Technical Field

The present invention generally relates to the collection of entry and departure information for multilingual travelers, and, more particularly, to systems and methods for the management of cross border traveler information prior to, during, and post boarding of air, sea, and land vessels of transportation.

2. Background

Governments worldwide have recognized the need to strengthen the information systems relating to the movement of visitors, tourists, and citizens through their borders and within their countries. This has become even more critical in the period since Sep. 11, 2001 as countries, large and small, grapple with the varied issues relating to immigration control and homeland security. Today's immigration control systems profile incoming travelers after they have arrived at their country of destination ("COD"). Evaluation of the travel-worthiness of the person traveling is currently based on the COD authority's access to information regarding the traveler. However, the datasets which arise from COD's administrative monitoring and passive surveillance of travelers provide information only for its own citizens and residents, and from a first interaction of a specific jurisdiction with the traveler, generally through an immigration officer, without access to ancillary external country of origin ("COO") sources. Moreover, even if the traveler is found at the COD to be a non-desirable visitor, the traveler has already posed a threat to the COD and other travelers on the respective incoming vessel.

Therefore, there is a need in the art of travel security to profile travelers prior to, during, and, after traveler embarkation on varied transport vessels.

SUMMARY

Accordingly, embodiments consistent with the present invention relate to profiling systems and methods that may obviate one or more of the limitations or disadvantages existing in the related art.

Embodiments consistent with the invention provide a method for managing traveler information of a traveler having a country of origin and traveling from a country of embarkation to a country of destination. The method comprises receiving input data from a graphic user interface containing traveler information at the country of embarkation, sending the traveler information to the country of origin, and requesting confirmation from the country of origin of the accuracy of the traveler information by comparing the traveler information with data received from at least one of a police department, customs department, or immigration department. The method further comprises receiving the confirmed traveler information from the country of origin and verifying traveler identity at the country of embarkation.

It is to be understood that both the foregoing general description and the following detailed description are exemplary and explanatory only and are not restrictive of the invention, as claimed.

The accompanying drawings, which are incorporated in and constitute a part of this specification, illustrate several embodiments consistent with the invention and together with the description, serve to explain the principles of the invention.

DEFINITIONS

Figure 1:
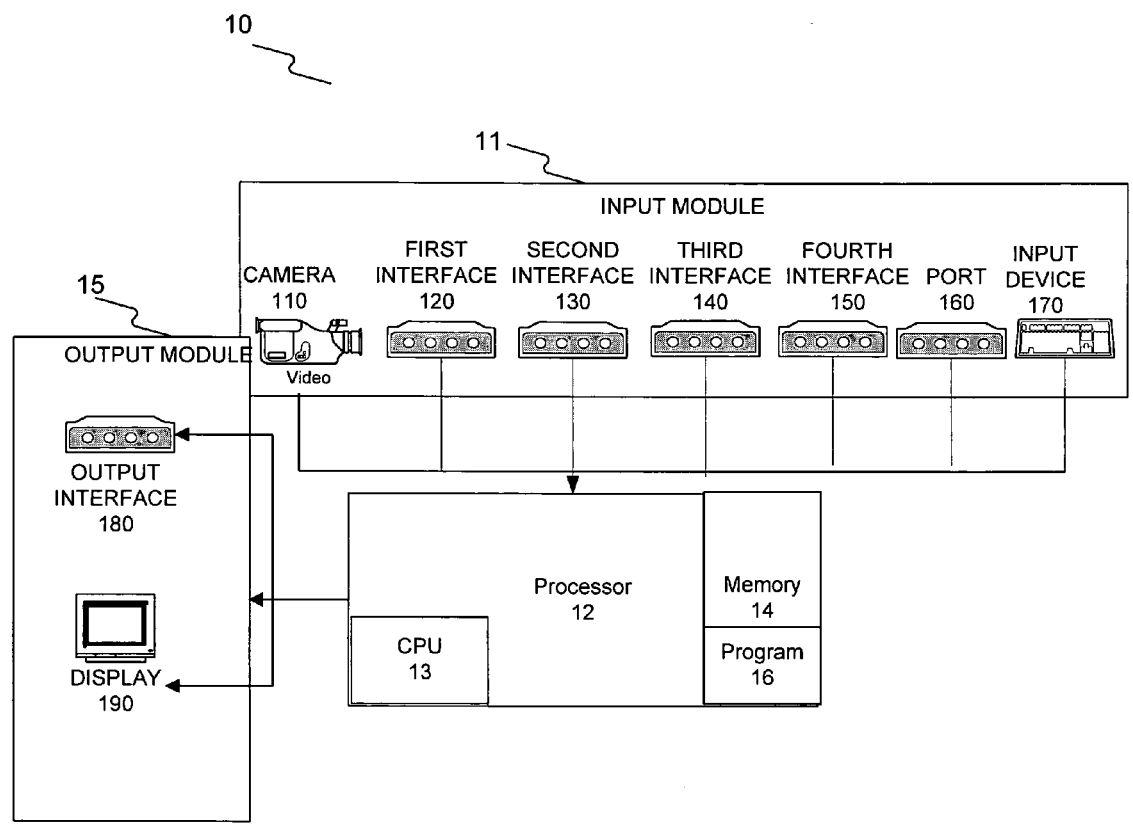
FIG. 1 is an exemplary top and side view of a computer system which facilitates access to the methods consistent with the principles of the present invention.

As used in the description herein, COD refers to the country to which a traveler is traveling. A country of embarkation ("COE") refers a country in which a traveler is trying to embark on a vessel of transportation to travel to the COD. Finally, COO refers to a traveler's place of birth, citizenship, residence, or domicile.

DESCRIPTION OF THE EMBODIMENTS

Reference will now be made in detail to exemplary embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features consistent with the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention.

Embodiments of the present invention are directed to systems and methods for the management of cross-border traveler information prior to, during, and after boarding of air, sea, and land vessels of transportation. Embodiments of the invention may be implemented in various environments, including computer-based environments, such as personal computers, workstations, servers, laptops, personal digital assistants (PDAs), mobile phones, handheld devices, and other computing devices, workstation, networked and other computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implemented features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are also known, such as, for example transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments of the present invention, as disclosed herein.

By way of example, methods consistent with the present invention may be implemented via the combination of components included in a system 10 of FIG. 1. As illustrated, system 10 may comprise an input module 11, which in turn may comprise a camera 110 to capture still or moving images for visual validation of travelers, a first interface 120 to read data from a smartcard, a second interface 130 to acquire facial scan, a third interface 140 to facilitate an iris scan, a fourth interface 150 to acquire a fingerprint image/scan, a port 160 to read identification information on travel documents for cross-referencing traveler information, and an input device 170. System 10 may also comprise an output module 15, which includes an output interface 180 and a display console 190.

Camera 110 may be of any type known to one skilled in the art. For example, in one embodiment, camera 110 may be a digital ultraviolet camera with auto-focus mechanism to capture digital ultra-violet photographs for visual validation of travelers.

First interface 120 may be configured to read smartcards of any form known to one skilled in the art. For example, in one embodiment, first interface 120 is configured to read a national identification card including elements to store information that is unique to each traveler. An exemplary structure for the national identification card may contain a variety of types of authentication to augment the security of embodiments consistent with the principles of the present invention. For example, the national identification card may include preformatted ROM data, security format keys and characteristics, personalization files, laser-engraved serialization barcodes, and other machine readable codes, such as OCR-B and 2D barcodes. Furthermore, to enhance the security of the system, anti-counterfeiting mechanisms may be included on the national identification card. For example, the national identification card may include, but is not limited to, eye-visible anti-counterfeiting features, such as micro-optical imaging, optical watermarks, an embedded hologram, optical WORM media, subsurface laser-engraved serialization, and custom artwork.

Second interface 130 may be configured to acquire a facial scan using any known technology used for such a purpose. For example, in one embodiment, second interface 130 may be used to acquire a facial scan from a digital video camera and to transmit the digital image to system 10 to process the acquired data.

Third interface 140 may be configured to facilitate an iris scan using any known technology used for such a purpose. For example, in an embodiment, third interface 140 may be used to acquire an iris scan from commercially available retina scanning devices. In an alternate embodiment, third interface 140 may be used to acquire an iris scan from any commercially available electronic camera, such as a digital still or video camera Fourth interface 150 may be configured to acquire a fingerprint image using any known technology used for such a purpose. For example, in one embodiment, fourth interface 150 may be used to acquire a fingerprint image from a scanner and to transmit the image to system 10 to process the acquired data.

Port 160 may be adapted to read data on travel documents associated with each traveler. For example, in one embodiment, port 160 may be configured to read imprinted 2-D and 3-D barcodes on travel documents for cross-referencing traveler information. The term "travel document" refers to any document that may be needed for travel. For example, the travel document may be a passport, a ticket, an itinerary printout, etc. In another embodiment, port 130 may be expanded to accommodate optical memory strip reading.

Input device 170 may be a keyboard, mouse, microphone, or any other device for enabling the user to input data into system 10. Output interface 180 may be used to communicate with other systems located remotely or locally. For example, in one embodiment, output interface 180 may be used to communicate with systems located at the COO and the COD if system 10 is located at a country of embarkation ("COE"). It will be appreciated by one skilled in the art that system 10 may be located at any location including the COD and COO. Display 190 may be a CRT monitor, LCD display, video screen, or any other device for enabling visual interaction between a user and system 10.

System 10 may include a processor 12 including a CPU 13 to execute a program 16 (discussed below in FIGS. 2 and 3) located in a memory 14, consistent with the principles of the present invention. Processor 12 in some embodiments, may communicate with program 16 located remotely using well-known communication means, such as the internet, a virtual private network, an intranet, or any other structure for enabling communication between two or more nodes or locations. Processor 12 may be located in an integrated structure which also includes input module 11 and output module 15. Alternatively, processor 12 may be provided at a location remote from input module 11 and output module 15.

Figure 2:
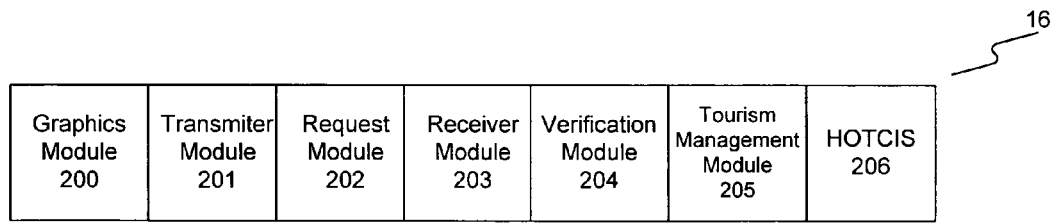
FIG. 2 is an exemplary structure of a software program for the management of cross border traveler information, in accordance with the systems and methods consistent with the principles of the present invention.

System 10, consistent with the present invention, may include components, such as modules of program 16, to implement methods consistent with embodiments of the present invention. For example, as shown in FIG. 2, program 16 may include a graphics module 200, a transmitter module 201, a request module 202, a receiver module 203, and a verification module 204. Graphics module 200, by way of example, can be used to receive input data from a graphic user interface at the COE, wherein the input data may include traveler information (see e.g., FIG. 3, S.10). Transmitter module 201, by way of example, may be used to send the input data to from the COE to the COO (see e.g., FIG. 3, S.20). Request module 202 may be used to request confirmation of the accuracy of the input, for example by comparing the traveler information with data received from at least one of a police department, customs department, or immigration department (see e.g., FIG. 3, S.30). Receiver module 203, by way of example, may be used to receive the confirmed input data from the country of origin (see e.g., FIG. 3, S.40). Verification module 205, by way of example, may be used to verify traveler identity at the COE (see e.g., FIG. 3, S.50).

Program 16 may also include multilingual middleware modules, which are part of a suite to facilitate visitor entry and cross border travel. This is done through the collection and analysis of origin, entry, and departure Information. Additionally program 16 may include: an identification module, which facilitates the identification of existing citizens, residents, and visitors exiting the country and real-time examination of information on incoming travelers. Program 16 may further include an evaluation and monitoring module which will provide statistical data, logistics, ergonomics, reports, and charts regarding the efficiency of the platform, while seamlessly integrating global border crossing procedures and management.

In an alternative embodiment, program 16 is further subdivided into regional modules that are accessible based on the region (e.g., hemisphere) where travelers are embarking. For example, program 16 can contain a regional module that relate to the Latin Americas and the Caribbean.

Figure 3:
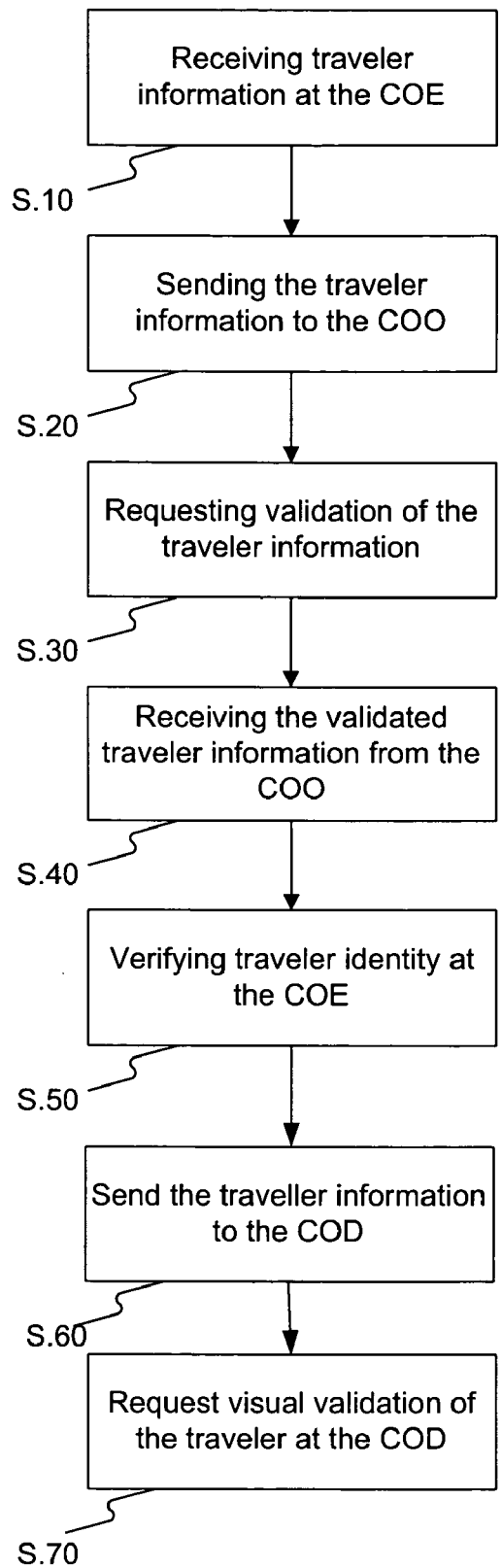
FIG. 3 is an exemplary flowchart of a process for the management of cross border traveler information, in accordance with the systems and methods consistent with the principles of the present invention.

FIG. 3 is an exemplary flowchart of a method managing cross border traveler information prior to, during, and after boarding of air, sea, or land vessels of transportation. Although the steps of the flowchart are described in a particular order, one skilled in the art will appreciate that these steps may be performed in a modified or different order. Further, one or more of the steps in FIG. 3 may be performed concurrently or in parallel.

First, traveler information is received at the COE (step S.10). Traveler information can be inputted at any location in the COE, such as at airports, seaports, train stations, bus stations, and the traveler's home through the internet.

After receiving the traveler information, the traveler information is sent to the traveler's COO to validate the traveler's identity before the traveler is allowed to embark on the vessel of transportation (step S.20). Communication between the COE and the COO to enable back office cross-referencing of traveler records can be accomplished through secure nodes on any well-known telecommunications network, such as PSTN, WAN, LAN, satellite, and wireless networks.

After sending the traveler information to the COO, validation of the traveler information is requested (step S.30). Validation at each traveler's respective COO occurs by uploading from the COO individual sets of traveler information, including traveler identification. The sets of traveler information can be enhanced by integrating existing traveler information and information gathered on a real time basis from, but not limited to: (a) immigration, (b) police, (c) customs (d), registrar of births and deaths; (e) and national identification authorities, such as electoral departments This intermingling of information in one embodiment may be facilitated by using a "demilitarized information zone" where all due diligence and ID validation is effected. Systems consistent with embodiments of the present invention require an accurate compilation of each COO's master dataset. To ensure this, preliminary compilation may be constructed around a common methodology to ensure the accuracy and self-policing of this information.

The primary benefit of this process is access to ancillary external COO sources. In contrast, current procedures are predominantly based on internal profiling in the country of destination/disembarkation, an isolated process which, since it is achieved in an information vacuum, does not benefit from ancillary external COO sources.

Returning to FIG. 3, next the identity of the traveler is validated at the COO and the result is transmitted back to the COE (step S.40). Subsequently, in response to the validation results transmitted from the COO, the traveler identity is verified at the COE (step S.50). Verification of traveler identity may occur though any mechanism chosen by the COE. For example, the COE may decide to prohibit entry of a traveler that is on a terrorist watch list maintained by the traveler's COO. On the other hand, the COE may deny entry to a traveler that is a known criminal in the traveler's COO. For the travelers that are allowed entry onto the vessel of transportation, the information is disseminated from the COE to the COD using any appropriate telecommunications means after requesting the COO to validate the identity of each potential passenger effecting cross border travel (step S.60).

Finally, after the traveler arrives at the COD, visual validation of the identity is requested (step S.70). In one embodiment, visual validation of travelers at the COD is complimented by machine-augmented procedures, such as fingerprint scanning, facial scanning, iris scanning, or DNA sequence matching, and further refined by access to information from external security agencies or the use of a national identification card as described above. Identification units located in the COD may utilize any well-known technology to authenticate the traveler, such as machine readable passports and using magnetic imaging character recognition, polycarbonate ID passports with laser serialization, biometric activation circuitry, and corresponding fingerprint intake units and other technology. For example, periodic remote synchronization of a roaming electronic travel record (ETR) imprinted in augmented passports may be used. Each passport may have the ETR which was first collected prior to embarkation at the COE, validated at the COO, and corroborated at the COD for each traveler. At the COD, authorized staff at linked security points may have limited access to the visual validation component of the ETR. These visual validation procedures may require a visual affirmation in conjunction with an automatic authentication to effect both visual verification of the identity of the traveler and validation of traveler domicile information while in the COD.

Furthermore, consistent with embodiments of the present invention, data that is compiled by cross border management may include demographics data which provides market intelligence critical for tourism sectors in tourism dependent economies. To enable this, a tourism management module 205 may be provided in program 16 that has global modules which operate in synchronization with other modules of program 16 and produce real time dynamically inter-linked databases. Such databases may provide:

a) real-time time data entry of arrivals and departures
b) tracking of visitor spending and tourists' experiences in the island;
c) a regulatory function of tracking visitor overstays and short stay patterns, as well as movement of visitors and frequency of visits;
d) a pro-active marketing system
e) a truly integrated visitor incentive program;
f) an efficient real-time survey collection package; and
g) information for the conduct of marketing research and planning of marketing strategies.

In another embodiment, methods and systems consistent with the present invention include a HOTCIS (Heart of the Caribbean Information System) middleware module 206 which produces modified content in accordance with the systems and methods consistent with embodiments of the present invent. The HOTCIS middleware module 206 is described more completely in the aforementioned U.S. Provisional Applications Nos. 60/578,283 and 60/590,436.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing traveler information of a traveler having a country of origin and traveling from a country of embarkation to a country of destination, the method comprising:
    receiving input data from a graphic user interface containing traveler information at the country of embarkation;
    sending the traveler information to the country of origin, wherein the country of origin is different than the country of embarkation;
    requesting confirmation from the country of origin of the accuracy of the traveler information by comparing the traveler information with data received from at least one of a customs department, a registrar of births and deaths, an electoral department, or an immigration department;
    receiving the confirmed traveler information from the country of origin; and
    verifying traveler identity at the country of embarkation.

2. The method of claim 1, further comprising sending the confirmed traveler information from the country of embarkation to the country of destination.

3. The method of claim 2, further comprising requesting visual confirmation of the traveler identity at the country of destination using the confirmed traveler information.

4. The method of claim 3, wherein the visual confirmation includes confirming the traveler identity at the country of destination using a barcode on a travel document.

5. The method of claim 4, wherein the travel document is a passport.

6. The method of claim 3, wherein the visual confirmation further includes confirming the traveler identity at the country of destination using a national identification card.

7. The method of claim 3, wherein the visual confirmation step further includes confirming the traveler identity at the country of destination using at least one of a fingerprint, face scan, iris scan, or DNA sequence associated with the traveler.

8. The method of claim 3, wherein the confirmed traveler information is used to provide marketing intelligence for tourism sectors in tourism dependent economies.

9. A method for managing traveler information of a traveler having a country of origin and traveling from a country of embarkation to a country of destination, the method comprising
    receiving a confirmation request for traveler information at the country of origin from the country of embarkation, wherein the country of origin is different than the country of embarkation;
    confirming the accuracy of the traveler information at the country of origin by comparing the traveler information with data received from at least one of a customs department, a registrar of births and deaths, an electoral department, or an immigration department;
    sending the confirmed traveler information to the country of embarkation.

10. A method for managing traveler information of a traveler having a country of origin and traveling from a country of embarkation to a country of destination, the method comprising:
    receiving confirmed traveler information at the country of destination from the country of embarkation, wherein the confirmed traveler information is based on data received from at least one of a customs department, a registrar of births and deaths, an electoral department or an immigration department of the country of origin, wherein the country of origin is different than the country of embarkation; and
    visually confirming traveler identity at the country of destination using the confirmed traveler information.

11. The method of claim 10, wherein the visually confirmation step includes confirming the traveler identity at the country of destination using a barcode on a travel document.

12. The method of claim 11, wherein the travel document is a passport.

13. The method of claim 10, wherein the visually confirmation step further includes confirming the traveler identity at the country of destination using a national identification card.

14. The method of claim 10, wherein the visually confirmation step further includes confirming the traveler identity at the country of destination using at least one of a fingerprint, face scan, iris scan, or DNA sequence associated with the traveler.

15. The method of claim 10, wherein the confirmed traveler information is used to provide marketing intelligence for tourism sectors in tourism dependent economies.

16. A computer program product including instructions for execution by a processor to perform a method for managing traveler information of a traveler having a country of origin and traveling from a country of embarkation to a country of destination, the method comprising:
    receiving input data from a graphic user interface containing traveler information at the country of embarkation;

sending the traveler information to the country of origin, wherein the country of origin is different than the country of embarkation, requesting confirmation from the country of origin of the accuracy of the traveler information by comparing the traveler information with data received from at least one of a customs department, a registrar of births and deaths, an electoral department, or an immigration department;

receiving the confirmed traveler information from the country of origin; and verifying traveler identity at the country of embarkation.

17. The method of claim 16, further comprising sending the confirmed traveler information from the country of embarkation to the country of destination.

18. The method of claim 17, further comprising requesting visual confirmation of the traveler identity at the country of destination using the confirmed traveler information.

19. The method of claim 18, wherein the visual confirmation includes confirming the traveler identity at the country of destination using a barcode on a travel document.

20. The method of claim 19, wherein the travel document is a passport.

21. The method of claim 18, wherein the visual confirmation further includes confirming the traveler identity at the country of destination using a national identification card.

22. The method of claim 18, wherein the visual confirmation step further includes confirming the traveler identity at the country of destination using at least one of a fingerprint, face scan, iris scan, or DNA sequence associated with the traveler.

23. The method of claim 18, wherein the confirmed traveler information is used to provide marketing intelligence for tourism sectors in tourism dependent economies.

24. A system for managing traveler information of a traveler having a country of origin and traveling from a country of embarkation to a country of destination, the system comprising:

a component for receiving input data from a graphic user interface at the country of embarkation, the input data containing traveler information;

a component for sending the traveler information to the country of origin, wherein the country of origin is different than the country of embarkation;

a component for requesting confirmation from the country of origin of the accuracy of the traveler information by comparing the traveler information with data received from at least one of a customs department, a registrar of births and deaths, an electoral department, or an immigration department;

a component for receiving the confirmed traveler information from the country of origin; and a component for verifying traveler identity at the country of embarkation.

25. The system of claim 24, further comprising a component for sending the confirmed traveler information from the country of embarkation to the country of destination.

26. The system of claim 25, further comprising a component for requesting visual confirmation of the traveler identity at the country of destination using the confirmed traveler information.

27. The system of claim 26, wherein the visual confirmation includes confirming the traveler identity at the country of destination using a barcode on a travel document.

28. The system of claim 27, wherein the travel document is a passport.

29. The system of claim 26, wherein the visual confirmation further includes confirming the traveler identity at the country of destination using a national identification card.

30. The system of claim 26, wherein the visual confirmation step further includes confirming the traveler identity at the country of destination using at least one of a fingerprint, face scan, iris scan, or DNA sequence associated with the traveler.

31. The system of claim 26, wherein the confirmed traveler information is used to provide marketing intelligence for tourism sectors in tourism dependent economies.

* * * * *